United States Patent
Gamanho

(10) Patent No.: US 8,949,867 B2
(45) Date of Patent: Feb. 3, 2015

(54) SYSTEM AND METHOD FOR PROVIDING TRANSACTION MONITOR INTEGRATION WITH SERVICE COMPONENT ARCHITECTURE (SCA) RUNTIME

(75) Inventor: Maurice Gamanho, Lebanon, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 953 days.

(21) Appl. No.: 12/646,748

(22) Filed: Dec. 23, 2009

(65) Prior Publication Data

US 2011/0154379 A1 Jun. 23, 2011

(51) Int. Cl.
  *G06F 9/54* (2006.01)
  *G06F 9/46* (2006.01)
(52) U.S. Cl.
  CPC .................................. *G06F 9/466* (2013.01)
  USPC ............ 719/330; 707/703; 717/102; 717/107
(58) Field of Classification Search
  CPC ..................................................... G06F 9/466
  See application file for complete search history.

(56) References Cited

U.S. PATENT DOCUMENTS

| 2003/0033369 | A1* | 2/2003 | Bernhard | 709/203 |
| 2008/0052503 | A1* | 2/2008 | Beisiegel et al. | 713/1 |
| 2008/0126474 | A1* | 5/2008 | Beisiegel et al. | 709/203 |
| 2008/0294712 | A1* | 11/2008 | Lu et al. | 709/202 |

OTHER PUBLICATIONS

Ramkumar Ramalingam, Desing and develop SCA components using the Spring Framework, Part 1: The trifecta: Spring, SCA, and Apache Tuscany, Oct. 6, 2009. pp. 1-11.*
Services Architecture leveraging Tuxedo (SALT) 1.1 now available, Aug. 29, 2006, 2 pages.*

* cited by examiner

*Primary Examiner* — H S Sough
*Assistant Examiner* — Syed Roni
(74) *Attorney, Agent, or Firm* — Meyer IP Law Group

(57) ABSTRACT

A system and method for providing transaction monitor integration with a service component architecture (SCA) runtime. In accordance with an embodiment, a transaction server, such as a Tuxedo or other transaction server, is provided with a transaction interface which provides one or more transaction services to other SCA software components. A configuration file, such as a schema file, can be used to define a transactional behavior of the transaction server within a service oriented environment based on the transaction interface, and to publish the one or more transaction services in the service oriented environment. The software components can use the schema file to invoke the one or more transaction services through the transaction interface.

20 Claims, 11 Drawing Sheets

```
1   <binding.atmi requires="transactionalintent,legacyintent"?>
2       <tuxconfig>...</tuxconfig>?
3       <map target="name">...</map>*
4       <serviceType target="name">...</serviceType>*
5       <inputBufferType target="name">...</inputBufferType>*
6       <outputBufferType tar    get="name">...</outputBufferType>*
7       <errorBufferType target="name">...</errorBufferType>*
8       <workStationParameters>?
9           <networkAddress>...</networkAddress>?
10          <secPrincipalName>...</secPrincipalName>?
11          <secPrincipalLocation>...</secPrincipalLoc    ation>?
12          <secPrincipalPassId>...</secPrincipalPassId>?
13          <encryptBits>...</encryptBits>?
14      </workStationParameters>
15      <authentication>?
16          <userName>...</userName>?
17          <clientName>...</clientName>?
18          <groupName>...</groupName>?
19          <pass wordIdentifier>...</passwordIdentifier>?
20          <userPa sswordIdentifier>...    </userPasswordIdentifier>?
21      </authentication>
22      <fieldTablesLocation>...</fieldTablesLocation>?
23      <fieldTables>...</fieldTables>?
24      <fieldTablesLocation32>...</fieldTablesLoc    ation32>?
25      <fieldTables32>...</fieldTables32>?
26      <viewFilesLocation>...</viewFilesLocation>?
27      <viewFiles>...</viewFiles>?
28      <viewFilesLocation32>...</viewFilesLocation32>?
29      <viewFiles32>...</viewFiles32>?
30      <remoteAccess>...</remoteAccess>?
31      <transaction timeout="xsd:long"/>?
32  </binding.atmi>
```

Figure 2

```
1   <composite name="MyValueComposite">
2
3       <service name="VALSVC">
4           <interface.cpp header="MyValueService.h"/>
5           <binding.atmi/>
6       </service>
7
8   <component n ame="MyValueServiceComponent">
9       <implementation.cpp library="MyValueService"/>
10      <reference name="CustomerService"/>
11      <reference name="StockQuoteService"/>
12  </component>
13
14  <reference name="CustomerService"/>
15  <reference name="StockQuoteService"/>
16
17  </composite>
```

Figure 5

```
<composite name="BigBank">

<component name="LoansManagement">
        <implementation.composite name="Loans"/>
    </component>

<component name="CheckingManagement">
        <implementation.composite name="Checking"/>
    </component>

</composite>
```
— 601

```
<composite name="Loans">

<service name="Loans">
        <interface.cpp header="Loans.h"/>
        <binding.atmi/>
    </service>

<component name="LoansComponent">
        <implementation.cpp library="Loans"
                        header="LoansImpl.h"/>
    </component>
    ...

</composite>
```
— 602

```
<composite name="Checking">

<service name="Checking">
        <interface.cpp header="Checking.h"/>
        <binding.atmi/>
    </service>

<component name="CheckingComponent">
        <implementation.cpp library="Checking"
                        header="CheckingImpl.h"/>
    </component>
    ...
</composite>
```
— 603

Figure 6

```
...
namespace services
{
  namespace simpapp
  {
    class ToupperTuxService
    {
      public:
        virtual std::string toUpper(const std::string inputString) = 0;
        virtual CARRAY transform(const CARRAY inputCarray) = 0;
    };
  } // End simpapp
} // End services
```
— 701

```
<reference name="TUXSVC">
    <interface.cpp header="myService.h"/>
    <binding.atmi>
        <!-- no input/outputBufferType for toUpper: use default -->
        <inputBufferType target="transform">CARRAY</inputBufferType>
        <outputBufferType target="transform">CARRAY</outputBufferType>
    </binding.atmi>
</reference>
```
— 702

```
...
        const string result1 = tuxService->toUpper("input");
        cout << "Result 1: " << result1 << endl;

const CARRAY result2 = tuxService->transform(myCarray);
        // handle result
...
```
— 703

```
<service name="TUXSVC">
    <interface.cpp header="myService.h"/>
    <binding.atmi>
        <!-- no input/outputBufferType for toUpper: use default -->
        <inputBufferType target="transform">CARRAY</inputBufferType>
        <outputBufferType target="transform">CARRAY</outputBufferType>
    </binding.atmi>
</service>
```
— 704

Figure 7

```
service=TestString
tuxservice=ECHO
servicetype=service
inbuf=STRING
outbuf=STRING service=TestCarray
tuxservice=ECHO
servicetype=service
inbuf=CARRAY
outbuf=CARRAY
```
801

```
namespace services
{
  namespace simpapp
  {
    class Tests
    {
      public:
        virtual std::string TestString(const std::string inputString) = 0;
        virtual CARRAY TestCarray(const CARRAY inputCarray) = 0;
    };
  } // End simpapp
} // End services
```
802

```
<reference name= "ECHO">
    <interface.cpp header= "myService.h "/>
    <binding.atmi  requires="legacy" >
       <!-- no input/output  BufferType for TestString: use default -->
        <inputBufferType target= "TestCarray" >CARRAY</inputBufferType>
       <outputBufferType target= "TestCarray" >CARRAY</outputBufferType>
    </binding.atmi>
</reference>
```
803

Figure 8

```
<service name="TUXSVC">
    <interface.cpp header="myService.h"/>
    <binding.atmi requires="legacy">
        <map target="toUpper">TOUPPER</map>
        <map target="transform">TRANSFORM</map>
        <!-- no input/outputBufferType for toUpper: use default -->
        <inputBufferType target="transform">CARRAY</inputBufferType>
        <outputBufferType target="transform">CARRAY</outputBufferType>
    </binding.atmi>
</service>
```

901

```
...
    tpcall("TOUPPER", ...);
...
    tpcall("TRANSFORM", ...);
...
```

```
<composite xmlns="http://www.osoa.org/xmlns/sca/1.0"
     name="bigbank.account">
...
   <service name="AccountService">
       <interface.wsdl interface="http://www.bigbank.com/AccountService
              #wsdl.interface(AccountService)"/>
       <binding.ws/>
       <ref erence>AccountServiceComponent</reference>
   </service>

<component name="AccountServiceComponent">
      <implementation.cpp
                    library="Account" header="AccountServiceImpl.h"/>
      <reference name="accountDataService">
            AccountDa taServiceComponent
      </reference>
   </component>
...
</composite>
```
— 1001

```
<Definition ...>
        <WSBinding   id="AccountService_binding">
                 <ServiceGroup id="AccountService">
                         <Service name="TuxAccountService"/>
                 </ServiceGroup>
        </WSBinding>
</Definition>
```
— 1002

Figure 10

```
<composite xmlns="http://www.osoa.org/xmlns/sca/1.0"
    name="bigbank.account">

<reference name="StockQuoteWebService">
        <interface.wsdl interface="http://www.webserviceX.NET/#
            wsdl.interface(StockQuoteSoap)"/>
        <binding.ws endpoint="http://www.webserviceX.NET/#
            wsdl.endpoint(StockQuote/StockQuoteSoap)"/>
    </reference>

...
</composite>
```
⎬ 1101

Figure 11

SYSTEM AND METHOD FOR PROVIDING TRANSACTION MONITOR INTEGRATION WITH SERVICE COMPONENT ARCHITECTURE (SCA) RUNTIME

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention generally relates to middleware and transaction-based systems, and in particular to a system and method for integrating a transaction monitor with Service Component Architecture (SCA) components.

BACKGROUND

Middleware platforms, such as Tuxedo, provide support for distributed transaction processing in an enterprise-level computing environment. Such platforms, including Tuxedo, are particularly adept at unlocking enterprise legacy applications, and extending those enterprise legacy applications so that they can be used in a service-oriented manner, while at the same time delivering scalability and standards-based interoperability.

The term Service-Oriented Architecture (SOA) generally refers to a more recent software strategy which organizes the discrete functions contained within enterprise applications into interoperable, standards-based services, which can then be combined and reused to meet particular business needs. The related Service Component Architecture (SCA) describes a model for building applications and systems using SOA, and further builds on open standards, such as Web services, to extend and complement existing SOA approaches. The eXtreme Transaction Processing (XTP) describes an application style aimed at implementing large-scale, business-critical, transactional applications on the basis of distributed architectures, which in turn are implemented by leveraging commodity hardware and standards-based software.

These are the general environments within which embodiments of the present invention are intended to be used.

SUMMARY

Disclosed herein is a system and method for providing transaction monitor integration with a service component architecture (SCA) runtime. In accordance with an embodiment, a transaction server, such as a Tuxedo or other transaction server, is provided with a transaction interface which provides one or more transaction services to other SCA software components. A configuration file, such as a schema file, can be used to define a transactional behavior of the transaction server within a service oriented environment based on the transaction interface, and to publish the one or more transaction services in the service oriented environment. The software components can use the schema file to invoke the one or more transaction services through the transaction interface.

In accordance with an embodiment, an extension is provided to an existing SCA open-source runtime, and the runtime itself is packaged as an add-on to the Tuxedo product. The extension externalizes the configuration aspects related to the Tuxedo Transaction Monitor, and takes care of building and deployment issues by providing integrated client and component application build tools, and an integrated way of hosting components in a Tuxedo environment. These features allow external applications, such as C/C++ applications, to be written without knowledge of any Transaction Monitor infrastructure and yet still take advantage of it.

BRIEF DESCRIPTION OF THE FIGURES

FIG. 2 is an illustration that shows a pseudo-schema to define different ATMI binding elements, in accordance with an embodiment.

FIG. 5 is an illustration that shows a simple composite, in accordance with an embodiment.

FIG. 6 is an illustration that shows a complex composite containing one or more nested composites.

FIG. 7 is an illustration that shows SCA-to-SCA communications, in accordance with an embodiment.

FIG. 8 is an illustration that shows SCA-to-Tuxedo communications, in accordance with an embodiment.

FIG. 9 is an illustration that shows Tuxedo-to-SCA communications, in accordance with an embodiment.

FIG. 10 is an illustration that shows how an SCA component can be exposed using a Web Services binding, in accordance with an embodiment.

FIG. 11 is an illustration that shows the use of a reference to access a Web Service, in accordance with an embodiment.

DETAILED DESCRIPTION

Figure 1:
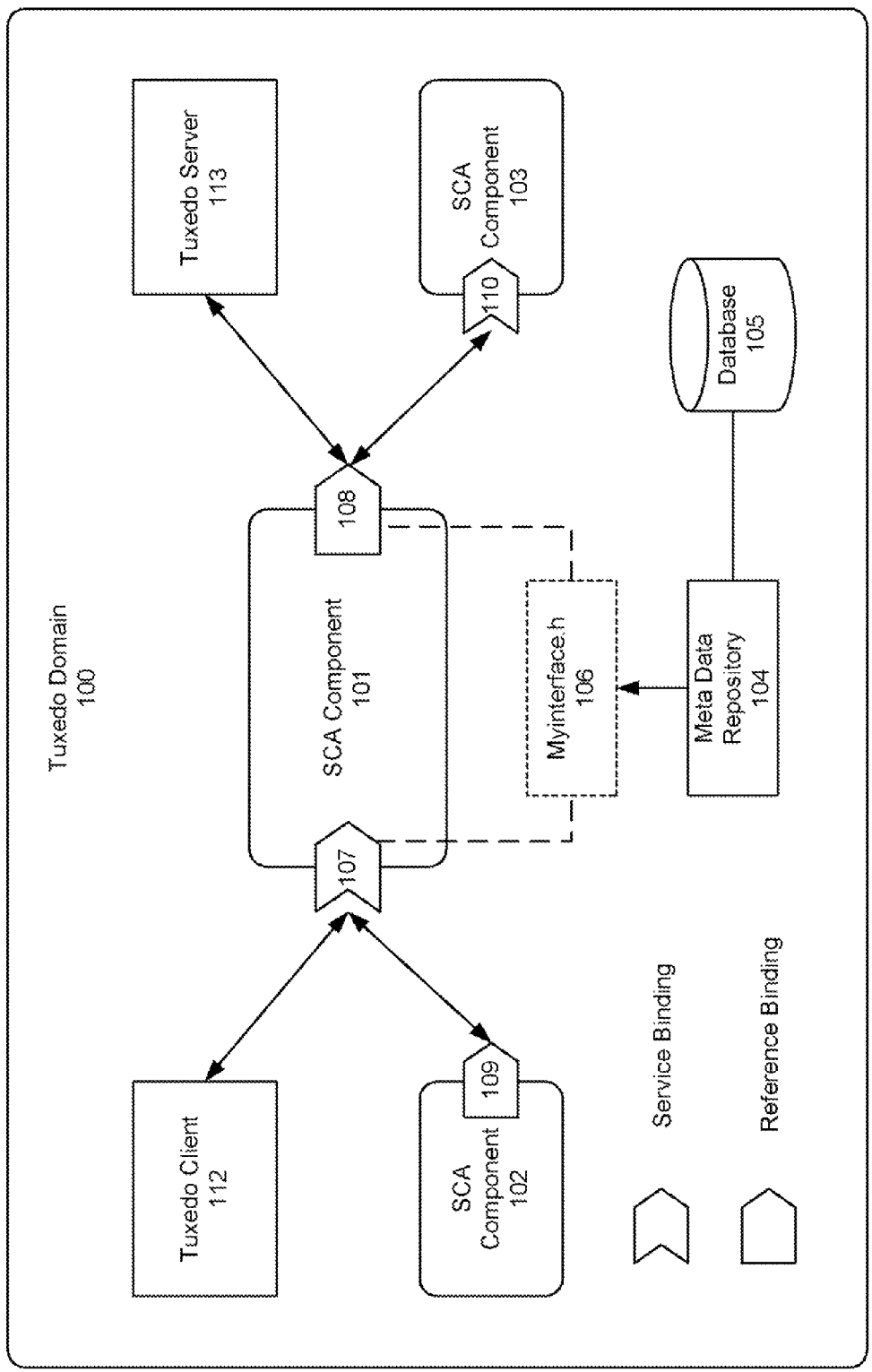
FIG. 1 is an illustration that shows the general architecture of an SCA container with ATMI binding, in accordance with an embodiment.

Embodiments of the invention are illustrated herein by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

The description of various embodiments of the invention as following uses Tuxedo functions or libraries as an example for distributed transaction functions or libraries. It will be apparent to those skilled in the art that other types of distributed transaction functions or libraries can be used without limitation.

In accordance with an embodiment, the system provides a transaction capability for Service Component Architecture (SCA) components in a Service Oriented Architecture (SOA) environment. The system allows SCA components to run on top of a transaction platform, such as, for example, the Tuxedo infrastructure. In accordance with an embodiment, an SCA Container provided in Tuxedo can take advantage of Tuxedo's important features: such as reliability, availability, scalability, and performance. In addition, The SCA Container in Tuxedo can integrate Tuxedo closer into an SOA environment. In accordance with an embodiment, enabling SCA in Tuxedo also contributes to solving the complex distribution requirements of eXtreme Transaction Processing (XTP).

In accordance with an embodiment, a transaction service provided by a transaction server can be integrated into a Service Oriented Architecture (SOA) environment. The transaction server uses the transaction interface to provide one or more transaction services. A schema file can be used to define transactional behavior of the transaction server in the service oriented environment based on the transaction interface, and to publish the one or more transaction services in the service oriented environment. The software component uses the schema file to invoke the one or more transaction services through the transaction interface. In accordance with an embodiment, a software component in the SOA environment includes a reference binding and a service binding. The reference binding is used by the software component to invoke the transaction service provided by the transaction server through the transaction interface. Similarly, a service binding can provide server-side runtime capability and allows software components in SOA environment and/or clients of the transaction service to call the software component.

System Architecture

SCA provides a programming model that aims at simplifying component re-use, and providing seamless communications between components. A Service Component Definition Language (SCDL) describes what components can perform in terms of interactions between each other, and instructs the framework to set-up necessary links or wires. As used in SCA, SCDL is an XML based language that is used to describe services, references, wires, components, and composites.

In an SOA environment, a SCA component is a configured instance of an implementation that includes the defined properties, provided services, and required service references. The aggregation of one or more components is referred to as a "composite". A "service" is a business function provided by a SCA component. A "reference" is a SCA component dependency on a service. A "wire" is a link between a service and a reference.

In accordance with an embodiment, a programming interface (API) is provided to support the development of transactional applications. For example, in accordance with an embodiment, a modified form of the Application-to-Transaction Monitor Interface (ATMI) is provided, which enables native Tuxedo applications to communicate with SCA components. In accordance with an embodiment, an ATMI binding and SCA container also enables SCA applications to take advantage of the Tuxedo framework, and allows SCA components to interoperate with native Tuxedo processes. In this manner, SCA applications can be combined with Tuxedo applications in an integrated environment, without requiring any change to the Tuxedo applications themselves. The applications in such an integrated environment can use those portions of APIs from both Tuxedo and SCA that are best suited to the particular application. In addition, the capabilities of the Tuxedo complex data type, such as FML32, can be used within SCA applications. In this manner, smooth interoperability and/or migration to/from Tuxedo and SCA can be achieved, and newer SOA-like capabilities can be easily introduced into the Tuxedo environment.

FIG. 1 is an illustration that shows the general architecture of an SCA container with ATMI binding, in accordance with an embodiment. As shown in FIG. 1, a domain, such as a Tuxedo domain 100 includes different software components, such as a plurality of SCA components 101, 102 and 103, a Tuxedo client 112, and a Tuxedo server 113. By way of example, SCA component 101 can include a service binding 107 and a reference binding 108, and can use the service binding to provide service either to another SCA component 102, through the reference binding 109 on the other SCA component; or to a Tuxedo client 112. Similarly, SCA component 101 can use the reference binding to call either on a service provided by another SCA component 103; or on a Tuxedo server 113. As shown in FIG. 1, the other SCA component 103 similarly provides service through its service binding 110. The system further includes a metadata repository 104, which contains service metadata in the Tuxedo domain, is connected to a database 105, and can be referred through a published interface 106 e.g., Myinterface.h.

ATMI Binding

In accordance with an embodiment, a modified version of the Application-to-Transaction Monitor Interface (ATMI) is provided, wherein the ATMI binding includes a plurality of elements, such as an ATMI runtime reference binding extension, ATMI runtime service binding extension, Transactional behavior in Tuxedo-based SCA environment, deployment of SCA components in a Tuxedo application, administration of SCA components in a Tuxedo application, and remote bindings using the Tuxedo infrastructure: jatmi, /WS and /Domains. In accordance with an embodiment, a schema file can be used to define the above different ATMI binding elements.

FIG. 2 is an illustration that shows a configuration or schema file used to define different ATMI binding elements, in accordance with an embodiment. As shown in FIG. 2, if the /binding.atmi/@requires attribute contains the legacyintent value (Line 1), then the system can be used to perform interoperability with existing Tuxedo services. A /binding.atmi/tuxconfig attribute indicates the Tuxedo application that the process can join (Line 2). A /binding atmi/map attribute provides the Tuxedo service name to be advertised for the corresponding /binding.atmi/map@target value (Lines 3-4). The schema can also define different types of data buffer that the software component process can use to exchange data with Tuxedo services (Lines 5-7). The schema can also support Tuxedo WorkStation protocol (Lines 8-14), and specify the security parameters to establish a connection with the Tuxedo application (Lines 15-21). Appendix A provides additional detailed definitions for different individual elements or tags contained in the schema file, in accordance with an embodiment.

In accordance with an embodiment, the /binding.atmi/@requires attribute can also be used to specify the transactional behavior that the binding extension follows.

If the /binding.atmi/@requires attribute is not specified or contains no value, then all transactional behavior is left up to the Tuxedo configuration. If the Tuxedo configuration supports transactions, then the transaction can be propagated if the transaction exists. If the Tuxedo configuration does not support transactions and the transaction exists, then an error can occur. In addition, a transaction may not be started if there is no transaction that already exists.

If the /binding.atmi/@requires attribute is specified as "suspendsTransaction," the transaction context may not be propagated to the service that is called by the binding extension. For a <service>, the transaction, if present, can be automatically suspended before invoking the application code, and can also be automatically resumed afterwards regardless of the outcome of the invocation. For a <reference>, the outcome is equivalent to making a tpcall( ) with the TPNOTRAN flag.

If the /binding.atmi/@requires attribute is specified as "propagatesTransaction," this specification is only applicable to the <reference> elements and is ignored by the <service> elements. A new transaction can be started if no transaction already exists. Otherwise, the system can participate in the existing transaction. For example, the transactional behavior can be obtained in a component or composite <service> in the system by configuring the component or composite <service> AUTOTRAN in the UBBCONFIG. Also, an error can be generated if a Tuxedo server hosts the SCA component implementation and the Tuxedo server is not configured in a transactional group in the UBBCONFIG.

Runtime Reference Binding Extension

In accordance with an embodiment, a runtime reference binding extension is provided as an implementation of the client-side aspect of the SCA container. The runtime reference binding encapsulates the necessary code to call other services, such as SCA components, Tuxedo servers, Web Services, and other services, transparently from an SCA-based component.

Users of the runtime reference binding extension, such as client applications, can provide different environment variables. These environment variables can be used by the SCA framework, in particular by an SCA kernel implementation that configures and manages the SCA environment. In addition, these environment variables can override the same parameters that are passed using command-line options. The followings are examples of these environment variables:

SCA_ROOT: path to the root of this SCA configuration, from where SCDL files are loaded.

SCA_COMPONENT: name of the default CompositeContext, which allows client applications to omit looking up a component.

In accordance with an embodiment, users use a buildscaclient command that encapsulates the environment variables above to perform calls over the Tuxedo infrastructure. The resolution of Tuxedo service and other parameters passed in the binding declaration are performed transparently. In accordance with an embodiment, checks can be made for process initialization and runtime, and an exception can be thrown if necessary.

In accordance with an embodiment, an ATMI binding reference can be used in a client-only application. Strict client applications, as opposed to server components making client calls, are programs that only make references to other SCA components. In one embodiment, these programs can load the SCDL model by calling the CompositeContext::getCurrent( ) method. Client applications can join a Tuxedo application and have the same characteristics as a regular ATMI client performing tpinit( ) with the TPMULTICONTEXTS flag. Such a client, which makes more than one reference via the ATMI binding, can issue one tpinit( . . . TPMULTICONTEXTS) call per reference. The call can be made at service lookup time (i.e. when calling CompositeContext::locateService( )). tpterm( ) can be invoked internally, when the CompositeContext object, obtained by calling CompositeContext::getCurrent( ) goes out of scope or an exception is caught. Successive calls to CompositeContext::locateService( ) can therefore not perform successive tpinit( ) calls. In another embodiment, the reference to tpinit( ) and tpterm( ) calls are performed internally and applications have no knowledge of it. And, whether tpinit( ) and tpterm( ) are called or not is not up to the application developer.

In accordance with an embodiment, each reference can have an associated Tuxedo application context that is internally shared among multiple threads if the client application is multi-threaded.

Runtime Service Binding Extension

In accordance with an embodiment, a runtime service binding extension is provided as an implementation of the server-side aspect of the SCA container. The runtime service binding extension encapsulates the necessary code and framework components to allow other SCA components, existing Tuxedo clients, or other service requesters, to transparently call SCA-based components.

In accordance with an embodiment, SCA components can be contained in shared libraries, used by the SCA kernel or the SCA framework. The runtime service extension can resolve these libraries at run-time, using the environment information below:

SCA_ROOT—path to the root of this SCA configuration, from where SCDL files is loaded.

In accordance with an embodiment, the system provides a command, buildscacomponent that can parse SCDL definitions and interfaces and produce shared libraries containing SCA components and SCDL configuration.

In accordance with an embodiment, a generated Tuxedo SCA server can dynamically link to SCA composites that declare services with bindings of type ATMI. This server can be generated using the buildscaserver command. In one example, this server can be added to a configuration file in order to include the SCA components, which it hosts as part of the Tuxedo application. The service binding extension code can then be linked to the server stub. This server can advertise services corresponding to the deployment rules. Requests received by the server can be assumed to be in a format suitable for processing by SCA components.

In accordance with an embodiment, in an environment such as Tuxedo, an SCA component implementation can be bootstrapped inside a Tuxedo server, so that the Tuxedo framework can forward requests to the Tuxedo server and send replies back to the client processes. The SCA component implementations can also be encapsulated in the Tuxedo server process.

In accordance with an embodiment, components can be built as SCA components, to create a number of shared libraries whose entry points correspond to the interfaces defined for the implementations. A Tuxedo server can then be built and constructed by parsing the corresponding SCDL code and interfaces. This generates a source file that dynamically advertises different Tuxedo services. The number of different Tuxedo services is defined by the <service> elements in the SCDL code that contains <binding.atmi> elements. The format of the binding provides a hint as to what actual method can be exposed by each Tuxedo service. Methods without a corresponding ATMI binding may not be exposed through Tuxedo.

In one example, the code generated in the above step contains the following functions:

A loadSCAComponents( ) function that takes the list of libraries (given by SCDL) and loads them dynamically.

An unloadSCAComponents( ) function that unloads the above libraries.

The tpsvrinit( ) function and dynamic reloading capability have access to the above two functions.

A mechanism to ensure that threads can be put in a quiescent state before the dynamic reloading capability can be performed.

In addition, each server can advertise a number of extra services for administrative purposes. These services can be invoked using a scaadmin tool. New servers hosting new composites are allowed to be added like normal Tuxedo application servers by dynamically configuring the Tuxedo application.

Invoking a Tuxedo Service from a Client Application

In accordance with an embodiment, the system provides two commands, buildscacomponent and buildscaserver, that can parse SCDL definitions and interfaces and produce a Tuxedo-deployable server along with Tuxedo-deployable elements, such as shared libraries containing SCA components and SCDL configuration. The buildscacomponent is used first to build the shared libraries containing the SCA components (as application code). Then, the buildscaserver command is used to build the server that can perform the interfacing between Tuxedo message queues and SCA components. In one example, the buildscaserver command takes source code (such as .c or .cpp files) and associated SCDL source as input, and the buildscaserver phase does not construct any application code.

Figure 3:
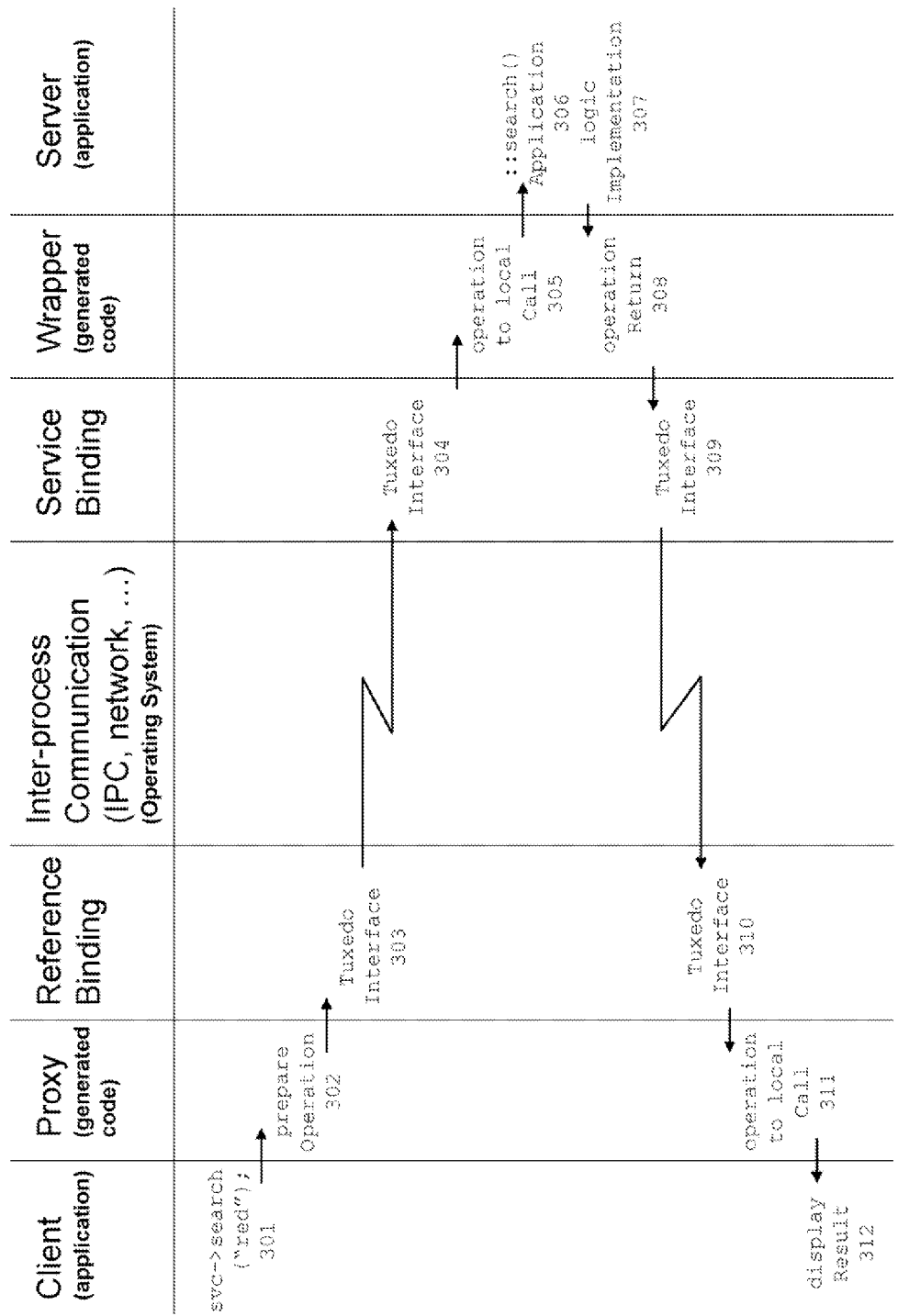
FIG. 3 is an illustration that shows a sequence of actions in an invocation of a service provided by a Tuxedo server, in accordance with an embodiment.

FIG. 3 is an illustration that shows the sequence of actions in an invocation of a service provides by a Tuxedo server, in accordance with an embodiment. At step 301, a client application sends a request to a SCA component through a proxy, which in turn performs a preparation operation, at step 302, to call a reference binding of the SCA component through the Tuxedo interface, at step 303. After inter-process communication, the SCA component invokes a service on a Tuxedo server through the service binding at step 304, whereas the service binding calls the wrapper object at step 305, which in turn invokes the service on the Tuxedo server at step 306. The logic implementation on the Tuxedo server then provides a response to the client through the steps of 307, 308, 309, 310, 311, and 312.

Deployment of SCA Components in a Tuxedo Application

In accordance with an embodiment, SCA components can be bundled together and deployed in a Tuxedo environment, so that they can be supported by Tuxedo servers. Deployment of SCA components in a Tuxedo environment can make use of Tuxedo's failover/load-balancing and scalability capabilities. In accordance with an embodiment, services of SCA components, such as offering services, can be specially handled in a Tuxedo environment, even though SCA components using Tuxedo references do not require any special processing.

In accordance with an embodiment, SCA components can be mapped into deployable Tuxedo entities. An SCA composite declaring one or more services with a <binding.atmi> definition can map to a single Tuxedo server advertising exactly as many services as the SCA composite.

Figure 4:
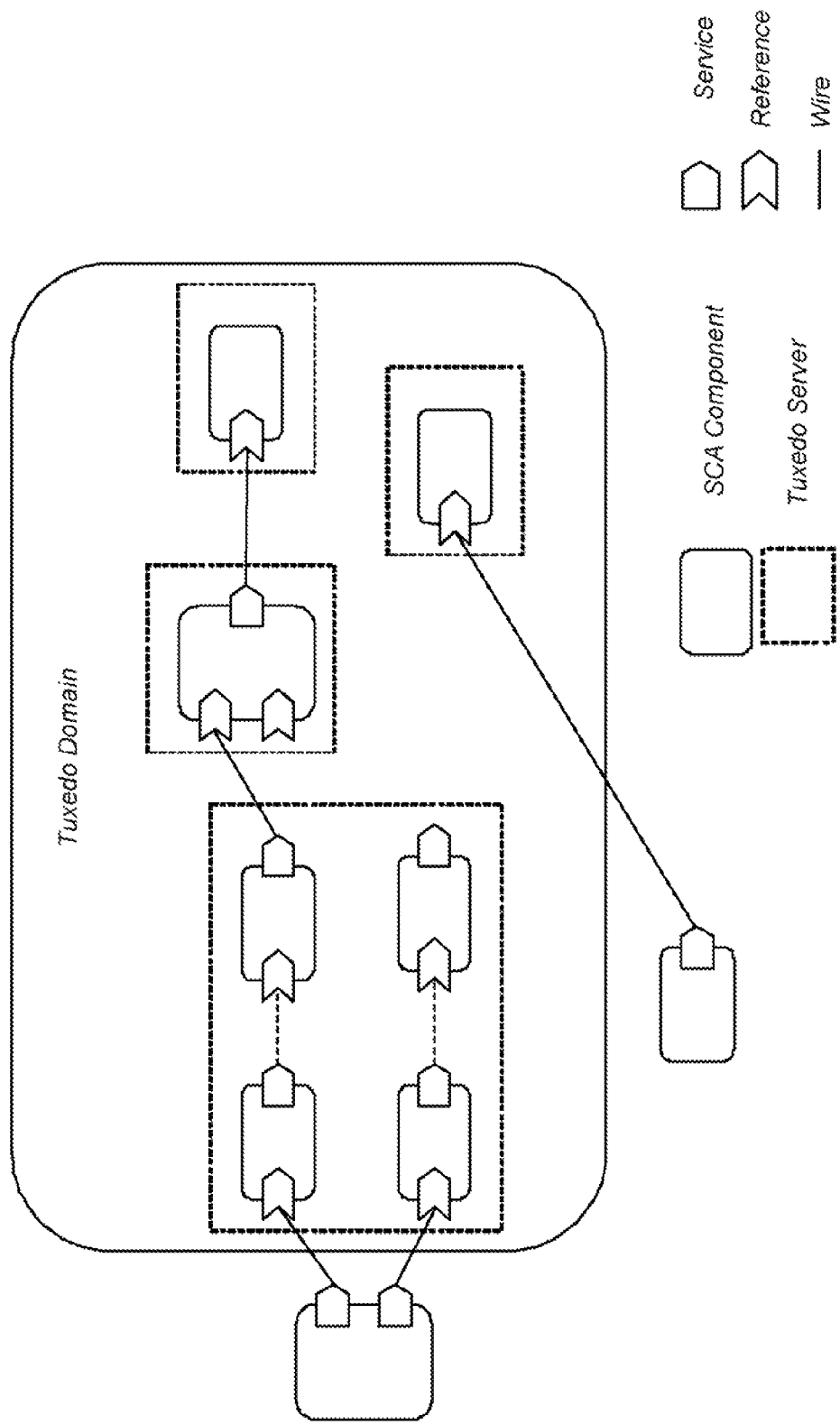
FIG. 4 is an illustration that shows the mapping between SCA components and Tuxedo servers, in accordance with an embodiment.

FIG. 4 is an exemplary illustration that shows the mapping between SCA components and Tuxedo servers. As shown in FIG. 4, there can be more than one composite, and the multiple composites can be nested. A service promoted by a composite as a service contained in a nested component can be advertised as a Tuxedo service. A service declared in a component but not promoted is not advertised. In one example, the resulting server advertises as many services as defined in the binding.atmi sections of the SCDL definition.

In accordance with an embodiment, an interface can declare multiple methods, and each method is linked to a Tuxedo native service by way of the /binding.atmi/@uri attribute. A method not declared via the /binding.atmi/@uri attribute is not accessible through Tuxedo. The use of duplicate service names can be detected at server generation time, so that Tuxedo service name list can correspond to interface method list defined in a single Tuxedo server instance.

In accordance with an embodiment, a generated Tuxedo server can act as a proxy for SCA components. An instance of this generated server corresponds to an SCA composite as defined in the SCDL configuration. Such servers can be deployed by the administrator.

In accordance with an embodiment, SCA composites can be deployed in a Tuxedo application by configuring instances of generated SCA servers in the UBBCONFIG file. Multiple instances are allowed, and multi-threading capabilities are also allowed and controllable using Tuxedo features.

FIG. 5 is an exemplary illustration that shows one simple composite. As shown in FIG. 5, a simple composite, with a name "MyValueComposite" (Line 1), can be contained in a single server instance generated using the buildscaserver command and advertises the Tuxedo service VALSVC (Line 3). The methods are contained in the interface and are described by MyValueService.h (Line 4). For example, a method "customer" in MyValueService.h can be advertised as "VALSVCcustomer". Furthermore, the simple composite can define the component that implements the advertised service (Line 8-12).

FIG. 6 is an exemplary illustration that shows one complex composite containing one or more nested composites. An application can contain two servers generated using the buildscaserver command. As shown in FIG. 6, the top-level composite, "BigBank" 601, contains two nested composites: a first nested composite, "Loans" 602, and a second nested composite 603, "Checking" 603.

Communication in an SCA Tuxedo Domain

In accordance with an embodiment, an SCA Tuxedo domain can include SCA components, and Tuxedo clients and/or servers. The communication between different components in a SCA Tuxedo domain can involve: SCA to SCA communications; SCA to Tuxedo communications; or Tuxedo to SCA communications.

FIG. 7 is an illustration that shows SCA to SCA communications, in accordance with an embodiment. The SCA to SCA communications allow a SCA component to use a service provided by another SCA component. As shown in FIG. 7, a first SCA component publishes an interface, myService.h 701. In addition, a corresponding service can be exposed at the first SCA component 704. A client on a second SCA component can define a reference 702 that connects to the interface. Then, a snippet of actual method calls 703 can be implemented in the client program to allow the client on the second SCA component to use the service provided by the first SCA component.

FIG. 8 is an illustration that shows SCA to Tuxedo communications, in accordance with an embodiment. A SCA component in the environment can use an ATMI service provided by a Tuxedo server. As shown in FIG. 8, the ATMI service can be defined using the service metadata repository entries 801 stored in a metadata repository. As a result, a header 802 can be generated for the Tuxedo server. Then, the SCA client can use the reference 803 to access the provided service on Tuxedo server.

FIG. 9 is an illustration that shows Tuxedo to SCA communications, in accordance with an embodiment. A Tuxedo client can use a service provided by a SCA component. As shown in FIG. 9, assuming the interface in FIG. 7, myService.h, is used, the service can be exposed at SCA component using an SCDL snippet 901. The Tuxedo client can implement an actual call to invoke the service provided by the SCA component 902.

Administration of SCA Components in a Tuxedo Application

In accordance with an embodiment, SCA components that declare services with a binding of type ATMI can be administered as regular Tuxedo servers. A Tuxedo administrator is able to boot new instances of these servers, monitor or shut them down using Tuxedo commands: tmboot, tmshutdown, tmadmin. Tuxedo administrators are able to monitor activity or availability of specific methods by using tmadmin and selecting the services declared in the bindings of type ATMI in the SCDL file.

Each server built with the buildscaserver command also contains administrative functions that can be invoked using a provided scaadmin command. This command allows reloading the composites hosted by individual SCA servers. On multi-threaded servers, the command waits until all the threads are in a state that allows performing this operation. SCA components/composites, which are contained in libraries, can be reloaded. In one example, only a re-load of the dynamic libraries implementing the components is performed, and, sometimes, a change in SCDL and/or interfaces can result in unpredictable behavior. This command also allows invoking minimal statistics display by dumping the list of services advertised with their corresponding method name, their status and the number of requests processed by each to the ULOG file.

Support of Remote Protocols

Tuxedo Workstation is a component that allows application clients to reside on a machine that does not have a full server-side installation, that is, a machine that does not support any administration or application servers. All communication between the client and the application servers takes place over the network.

In accordance with an embodiment, SCA invocations made using the SCA container can have the capability of being performed using the Tuxedo WorkStation protocol (/WS). This can be accomplished by specifying the value WorkStation in the <RemoteAccess> element of the <binding.atmi> element.

In accordance with an embodiment, only reference-type invocations are available in this mode. Service-type invocations can be performed using the /WS transparently. There is no difference in behavior or configuration. Furthermore, setting the <RemoteAccess> element to WorkStation for an SCA service can have no effect. In accordance with an embodiment, native and WorkStation libraries cannot be mixed within the same process, client processes have to be built differently depending on the type of remote access chosen.

Tuxedo Domains provide the infrastructure for interoperability among the domains of a business, thereby extending the Tuxedo client/server model to multiple transaction processing (TP) domains.

In accordance with an embodiment, SCA invocations made using the SCA container can have the capability of being performed using the Tuxedo /Domains protocol. Tuxedo services declared in <reference> elements containing a <binding.atmi> element can be added to the corresponding sections in a configuration file for the Tuxedo /Domains protocol.

In accordance with an embodiment, Tuxedo has a Java implementation of the ATMI API, and also support for remote access to Tuxedo applications using either the /WS or /Domains protocol (when available).

In accordance with an embodiment, a binding is provided on existing Java SCA kernels, such as Tuscany and Fabric3. This binding is delivered as reference. This binding allows SCA components written in Java to call Tuxedo services or SCA components running in a Tuxedo native environment; and to be called by Tuxedo client programs or SCA components running in a Tuxedo native environment.

Using the Web Services Binding

In accordance with an embodiment, Web Service bindings are used to leverage the Web Service protocol such as SOAP gateways. The SCA components can physically be hosted in Tuxedo servers, and the communications from/to the Tuxedo servers can be performed through a Web Service gateway. SCA clients using a Web Services binding can remain unchanged whether the server is running in a Tuxedo environment or a native SCA environment (i.e. exposing the component using the Web Services binding for instance).

When SCA components are exposed using the Web Services binding (for example, binding.ws), the system provides tooling that can generate WSDF information, metadata entries and FML32 field definitions. For example, when SCDL code of SCA components to be hosted in a Tuxedo domain (i.e., service elements) contains <binding.ws> elements, the buildscaserver command generates a WSDF entry in a file named service.wsdf where 'service' can be replaced using the name of the service exposed. An accompanying service.mif and service.fml32 field table files are also generated, based on the contents of the WSDL interface associated with the Web Service. A WSDL interface can be composed by the user, and an error message is printed out, if no WSDL interface can be found.

FIG. 10 is an illustration that shows an SCA component exposed using a Web Services binding, in accordance with an embodiment. As shown in FIG. 10, an AccountService in an SCA component 1001 contains <binding.ws> elements. In order to expose this service, the buildscaserver command can be used to convert SCDL code into a WSDF entry 1002, and produce a deployable server. In this manner the AccountService in the SCA component 1001 can be exposed as a Web Service.

The buildscaserver command can also construct a service metadata repository entry based on parsing the SCDL and interface. The interface can be in WSDL format, and C++ class interfaces can be converted into WSDL format. Then, a WSDL file can be converted into a WSDF entry. Also, the WSDF file can be imported into a configuration file, and the configuration file can be converted into binary format. After loading the service metadata entry into the service metadata repository, the Web Services binding reference extension is capable of performing the Web Services call.

FIG. 11 is an exemplary illustration that shows using a reference to access a Web Service that provides transaction services. As shown in FIG. 11, a reference is handled based on a SCDL excerpt 1101. The Web Service, StockQuoteWebService, provides transaction services through the <binding.ws> element. In order to access the Web Service that provides transaction services, the WSDL file is converted into a WSDF entry using the wsdlcvt tool. At the same time a service metadata entry (.mif file), and fml32 mapping file are generated. In this example, the service metadata repository entry is loaded into the service metadata repository using the tmloadrepos command. The WSDF file can be imported into the SALTDEPLOY file and wsloadcf can command can convert SALTDEPLOY into binary format. The service metadata entry (.mif file) can be loaded into the service metadata repository. Then, Web Services clients, such as SCA components and other clients, can access the Web Service.

In accordance with an embodiment, the above process can be the same, whether the client is a stand-alone SCA program or an SCA component which is a server referencing another SCA component via the Web Service binding.

APPENDIX A

Appendix A provided below provides more detailed definitions for different individual elements or tags contained in the schema file.

/binding.atmi/@requires

When the /binding.atmi/@requires attribute contains the legacy value, the system is used to perform interoperability with existing Tuxedo services. The communications can have SCA to SCA semantics where the actual Tuxedo service name is constructed from /service/@name, or /reference/@name, and actual method name.

When a value of legacy is encountered in this attribute, the following rules apply.

a. In a <reference> element: the value specified in the /reference/@name is used to perform the Tuxedo call, with semantics according to the interface method used.

b. In a <service> element: the Tuxedo service specified in the /binding.atmi/map element is advertised, and mapped to the method specified in the /binding.atmi/map/@target attribute.

When this attribute contains one of the values below, the binding extension can follow the transactional behavior as specified respectively.

a. not specified (no value)—all transactional behavior is left up to the Tuxedo configuration. If the Tuxedo configuration supports transactions, then one may be propagated if it exists. If the Tuxedo configuration does not support transactions and one exists then an error will occur. However a transaction is not started if one does not already exist.

b. suspendsTransaction—when specified, the transaction context is not propagated to the service called. For a <service>, the transaction, if present, can be automatically suspended before invoking the application code, and resumed afterwards, regardless of the outcome of the invocation. For a <reference>, equivalent to making a tpcall( ) with the TPNOTRAN flag.

c. propagatesTransaction—only applicable to <reference> elements, ignored for <service> elements. Starts a new transaction if one does not already exist, otherwise participate in existing transaction. Such a behavior can be obtained in a component or composite <service> by configuring it AUTOTRAN in the UBBCONFIG. An error can be generated if a Tuxedo server hosts the SCA component implementation and it is not configured in a transactional group in the UBBCONFIG.

/binding.atmi/tuxconfig

The /binding.atmi/tuxconfig attribute only applies when used in <reference> elements, when /binding.atmi/workstationParameters is not set for client-only processes. This attribute indicates the Tuxedo application that this process should join. This attribute allows one process to join multiple applications, or switch applications without having to restart. If this attribute is not set, the TUXCONFIG environment variable is used instead. If none is set, but one is required, the process exits and returns an error.

/binding.atmi/map

The /binding.atmi/map attribute only applies to <service> elements that provide the tuxedo service name that should be advertised for the corresponding /binding.atmi/map/@target value. The /binding.atmi/map/@target value can match a method name of the corresponding service interface.

/binding.atmi/serviceType

The /binding.atmi/serviceType attribute is an optional element that specifies the type of call being handled. The accepted values are:

a. "Oneway"—the call will not expect a response.

b. "RequestResponse"—regular call paradigm, default value.

/binding.atmi/inputBufferType, /binding.atmi/outputBufferType, and /binding.atmi/errorBufferType The /binding.atmi/inputBufferType, /binding.atmi/outputBufferType and /binding.atmi/errorBufferType attributes are optional elements that specify the type of buffer that the processes exchange.

The inputBufferType element is used by the binding extension to determine or check the type of the request, and the outputBufferType element is used by the binding extension to determine or check the type of the reply. The errorBufferType is used to determine the type of buffer specified in the data portion of the Exception thrown received by a client or thrown by a server.

The supported values and corresponding Tuxedo buffer types are summarized in Table 1. An incorrect value or syntax is detected at runtime and causes the call to fail. If this attribute is not specified, the default value used is STRING.

TABLE 1

| /binding.atmi/<br>bufferType value | Tuxedo buffer<br>type | Note |
|---|---|---|
| STRING | STRING | |
| CARRAY | CARRAY | |
| X_OCTET | X_OCTET | |
| VIEW | VIEW | Format is VIEW/<subtype> |
| X_C_TYPE | X_C_TYPE | Format is X_C_TYPE/<subtype> |
| X_COMMON | X_COMMON | Format is X_COMMON/<subtype> |
| VIEW32 | VIEW32 | Format is VIEW32/<subtype> |
| XML | XML | |
| FML | FML | Format is FML/<subtype>, <subtype> being optional The <subtype> value allows to specify the SDO type to use for that message (request or response) when it is described in an XML schema |
| FML32 | FML32 | Format is FML32/<subtype>, <subtype> being optional The <subtype> value allows to specify the SDO type to use for that message (request or response) when it is described in an XML schema |
| MBSTRING | MBSTRING | |

/binding.atmi/workStationParameters

The /binding.atmi/workStationParameters attribute is an optional element that specifies parameters specific to the Tuxedo WorksStation protocol. This attribute only used in references.

/binding.atmi/workStationParameters/networkAddress

The /binding.atmi/workStationParameters/networkAddress attribute provides the address of the workstation listener to which this application will connect. The format of this address is //<hostname or IP address>:<port>.

More than one address can be specified, if desired, by specifying a comma-separated list of pathnames for WSNADDR Addresses are tried in order until a connection is established. Any member of an address list can be specified as a parenthesized grouping of pipe-separated network addresses. The following is an example:

```
<networkAddress>
   (//m1.acme.com:3050 | //m2.acme.com:3050) , //m3.acme.com:3050
</networkAddress>
```

The system (e.g. TUXEDO) randomly selects one of the parenthesized addresses. This strategy distributes the load randomly across a set of listener processes. Addresses are tried in order until a connection is established.

/binding.atmi/authentication

The /binding.atmi/authentication attribute provides the values specify the security parameters used in reference-type calls to establish a connection with the Tuxedo application.

The values respectively correspond to the TPINFO structure elements usrname, cltname, grpname and passwd.
/binding.atmi/fieldTablesLocation and /binding.atmi/fieldTablesLocation32

The /binding.atmi/fieldTablesLocation attribute is an optional element that specifies a directory in the local file system where field tables should be searched. If a relative path is specified, files are searched in that location relative to $APPDIR, otherwise the location is assumed to be absolute.
/binding.atmi/fieldTables and /binding.atmi/fieldTables32

The /binding.atmi/fieldTables attribute is an optional element that specifies the FML field tables available. Field tables are searched in the location specified by the /binding.atmi/fieldTablesLocation element.

If the /binding.atmi/bufferType value is FML and this element is not specified or invalid (i.e. the tables indicated cannot be found or are not field tables), an error is displayed at initialization time for client processes, or boot time for server processes.
/binding.atmi/viewFilesLocation and /binding.atmi/viewFilesLocation32

The /binding.atmi/viewFilesLocation attribute is an optional element that specifies a directory in the local file system where view tables should be searched. If a relative path is specified, files are searched in that location relative to $APPDIR, otherwise the location is assumed to be relative.
/binding.atmi/viewFiles and /binding.atmi/viewFiles32

The /binding.atmi/viewFiles attribute is an optional element that specifies the VIEW files to be used by the affected component(s).

If the /binding.atmi/bufferType value is VIEW and this element is not specified or invalid (i.e. the files indicated cannot be found or are not view files), an error is displayed at initialization time for client processes, or boot time for server processes.
/binding.atmi/remoteAccess The /binding.atmi/remoteAccess attribute is an optional element that specifies the communication protocol with one of the values below.
  a. Native—indicates that components will use standard Tuxedo native communications (IPC Queues)
  b. WorkStation—indicates that components will use the Tuxedo /WS communication protocol. If set to this value, the binding extension will check that the /binding.atmi/workStationParameters element is also populated and valid. It will report an error message at initialization time otherwise.
/binding.atmi/transaction/@timeout The /binding.atmi/transaction/@timeout attribute specifies the amount of time, in seconds, a transaction can execute before timing out. This attribute affects components or clients that effectively start a global transaction. It is mandatory for <reference> components, ignored if set on <service> components. Additionally, the value is ignored on components for which the transaction has already been started. If a transaction need to be started and this attribute is not present, i.e. "requires=propagatesTransaction" is set on this binding, a configuration error will ensue.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD -ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system to integrate a service component architecture (SCA) environment and a transaction environment, comprising:
    one or more micro-processors;
    a plurality of SCA software components in an SCA environment;
    one or more transaction software components, executing on the one or more micro-processors, that are configured to provide a plurality of transaction services in a transaction environment;
    an SCA runtime container provided as an add-on to the transaction environment, wherein the SCA runtime container externalizes configurations of the transaction environment and is configured to deploy one or more SCA software components therein, wherein services provided by the one or more SCA software components are mapped to and advertised by a transaction server in the transaction environment; and
    a schema file that defines the services advertised by the transaction server and publishes the services advertised by the transaction server to the SCA environment;
    wherein the transaction server uses a transaction interface to support communication with an SCA software component in the SCA environment; and
    wherein the SCA software component uses the schema file to invoke, through the transaction interface, the services advertised by the transaction server.

2. The system according to claim 1, further comprising:
    a build client tool for creating shared libraries for the SCA software component that encapsulates environmental variables required to perform calls over the services advertised by the transaction server.

3. The system according to claim 1, further comprising a build server tool for building the transaction server that performs the interfacing between a transactional message queue and the SCA software component.

4. The system according to claim 1, wherein the transaction server supports a metadata repository.

5. The system according to claim 1, further comprising a schema that defines a reference binding, wherein the reference binding configures the SCA software component to call other SCA software components in the SCA environment, or to invoke a service advertised by the transaction server.

6. The system according to claim 1, wherein the one or more SCA software components deployed in the transaction environment make use of failover/load-balancing and scalability capabilities of the transaction server.

7. The system according to claim 1, further comprising: remote bindings using a transaction server infrastructure.

8. The system according to claim 1, further comprising: an administrative console that an administrator uses to deploy one or more services into the SCA environment, and to specify, for each service, a service level agreement and/or policies that defines minimum, maximum, or desired resource requirements associated with the service and/or with the one or more micro-processors on which the service is deployed.

9. A method to integrate a service component architecture (SCA) environment and a transaction environment, comprising:
providing a plurality of SCA software components in an SCA environment;
providing one or more transaction software components, executing on one or more micro-processors, that are configured to provide a plurality of transaction services in a transaction environment;
providing an SCA runtime container provided as an add-on to the transaction environment, wherein the SCA runtime container externalizes configurations of the transaction environment and is configured to deploy one or more SCA software components therein, wherein services provided by the one or more SCA software components are mapped to and advertised by a transaction server in the transaction environment; and
defining, in a schema file, the service advertised by the transaction server and publishing the services advertised by the transaction server to the SCA environment;
wherein the transaction server uses a transaction interface to support communication with an SCA software component in the SCA environment; and
wherein the SCA software component uses the schema file to invoke, through the transaction interface, the services advertised by the transaction server.

10. The method of claim 9, wherein a build client tool is used to create shared libraries for the SCA software component that encapsulates environmental variables required to perform calls over the services advertised by the transaction server.

11. The method of claim 9, wherein a build server tool is used to build the transaction server that performs the interfacing between a transactional message queue and the SCA software component.

12. The method of 9, wherein the transaction server supports a metadata repository.

13. The method of claim 9, wherein a reference binding is defined in a schema to configure the SCA software component to call other SCA software components in the SCA environment, or to invoke a service advertised by the transaction server.

14. The method of claim 9, wherein the one or more SCA software components deployed in the transaction environment make use of failover/load-balancing and scalability capabilities of the transaction server.

15. A non-transitory machine readable storage medium having instructions stored thereon that when executed cause a system to perform the steps comprising:
providing a plurality of SCA software components in an SCA environment;
providing one or more transaction software components, executing on one or more micro-processors, that are configured to provide a plurality of transaction services in a transaction environment;
providing an SCA runtime container provided as an add-on to the transaction environment, wherein the SCA runtime container externalizes configurations of the transaction environment and is configured to deploy one or more SCA software components therein, wherein services provided by the one or more SCA software components are mapped to and advertised by a transaction server in the transaction environment; and
defining, in a schema file, the service advertised by the transaction server and publishing the services advertised by the transaction server to the SCA environment;
wherein the transaction server uses a transaction interface to support communication with an SCA software component in the SCA environment; and
wherein the SCA software component uses the schema file to invoke, through the transaction interface, the services advertised by the transaction server.

16. The non-transitory machine readable storage medium of claim 15, wherein a build client tool is used to create shared libraries for the SCA software component that encapsulates environmental variables required to perform calls over the services advertised by the transaction server.

17. The non-transitory machine readable storage medium of claim 15, wherein a build server tool is used to build the transaction server that performs the interfacing between a transactional message queue and the SCA software component.

18. The non-transitory machine readable storage medium of claim 15, wherein the transaction server supports a metadata repository.

19. The non-transitory machine readable storage medium of claim 15, wherein a reference binding is defined in a schema to configure the SCA software component to call other SCA software components in the SCA environment, or to invoke a service advertised by the transaction server.

20. The non-transitory machine readable storage medium of claim 15, wherein the one or more SCA software components deployed in the transaction environment make use of failover/load-balancing and scalability capabilities of the transaction server.

* * * * *

UNITED STATES PATENT AND TRADEMARK OFFICE
CERTIFICATE OF CORRECTION

PATENT NO. : 8,949,867 B2  
APPLICATION NO. : 12/646748  
DATED : February 3, 2015  
INVENTOR(S) : Gamanho Page 1 of 1

It is certified that error appears in the above-identified patent and that said Letters Patent is hereby corrected as shown below:

Title page, column 2, References Cited under other publications, line 1, delete "Desing" and insert -- Design --, therefor.

In the claims

In column 15, line 54, in claim 12, delete "method of" and insert -- method of claim --, therefor.

Signed and Sealed this  
Twenty-fourth Day of November, 2015

Michelle K. Lee  
*Director of the United States Patent and Trademark Office*